United States Patent
Frost

Patent Number: 5,135,087
Date of Patent: Aug. 4, 1992

[54] DUAL-CONE SYNCHRONIZER WITH SERVO ACTION

[75] Inventor: Barry L. Frost, Dewitt, N.Y.

[73] Assignee: New Venture Gear, Inc., Troy, Mich.

[21] Appl. No.: 642,039

[22] Filed: Jan. 16, 1991

[51] Int. Cl.[5] .................................... F16D 23/06
[52] U.S. Cl. ................................. 192/53 F; 74/339
[58] Field of Search ......................... 192/53 F; 74/339

[56] References Cited

U.S. PATENT DOCUMENTS

| | | | |
|---|---|---|---|
| 3,700,083 | 10/1972 | Ashikawa et al. | 192/53 F |
| 4,267,912 | 5/1981 | Bauer et al. | 192/53 F |
| 4,413,715 | 11/1983 | Michael et al. | 192/53 F |
| 4,566,568 | 1/1986 | Yant | 74/339 X |
| 4,677,868 | 7/1987 | Filkins | 74/359 |
| 4,732,247 | 3/1988 | Frost | 192/53 F |
| 4,823,631 | 4/1989 | Kishimoto | 192/53 F X |

FOREIGN PATENT DOCUMENTS

| | | | |
|---|---|---|---|
| 0267714 | 5/1988 | European Pat. Off. | 192/53 F |
| 0052241 | 3/1987 | Japan | 192/53 F |

*Primary Examiner*—Rodney H. Bonck
*Attorney, Agent, or Firm*—Harness, Dickey & Pierce

[57] ABSTRACT

An improved dual-cone synchronizer apparatus having a middle cone ring concentrically disposed intermediate an outer blocker ring and an inner cone ring on a transmission shaft. The inner cone ring is formed with a plurality of longitudinally extending drive tangs projecting into an associated window formed on a flange portion of the blocker ring. Each drive tang defines a back-angled cam edge diverging outwardly at a first acute angle. Each window has a side wall disposed in spaced relation with its associated drive tang cam edge and adapted to be slidably engaged therewith upon energization of the synchronizer whereby the synchronizing torque is increased for a given input synchronizing force.

16 Claims, 4 Drawing Sheets

DUAL-CONE SYNCHRONIZER WITH SERVO ACTION

BACKGROUND OF THE INVENTION

The present invention relates to multiple cone-type synchronizers for manual transmissions and, more particularly, to an improved dual-cone synchronizer mechanism incorporating servo action.

In general, most synchronizer mechanisms typically used in manual transmissions and transfer cases are either of the "strut" or "strutless" types. Strutless synchronizers, such as disclosed in U.S. Pat. No. 3,700,083 issued Oct. 29, 1972 to N. Ashikawa, et al. typically employ a thrust member, such as an annular spring, interposed between a clutch sleeve and a blocker ring. The annular spring is mounted on the outer surface of a plurality of uniformly spaced lugs integrally formed on the blocker ring. Upon axial movement of the clutch sleeve the annular spring acts on the blocker ring to energize the synchronizer mechanism for generating sufficient cone torque to "clock" the blocker ring to a blocking position. Once synchronization is complete, the clutch sleeve passes over the annular spring and into lock-up engagement with a ratio gear such that torque is transmitted to the driven gear.

Strut-type synchronizers, such as disclosed in U.S. Pat. No. 4,566,568 issued Jan. 28, 1986 to Yant include a spring member radially interposed between the hub and the clutch sleeve for biasing a strut radially outwardly into engagement with a detent groove formed in the inner bore of the clutch sleeve. Axial displacement of the clutch sleeve causes the strut to act on the blocker ring for energizing the synchronizer mechanism to block further axial displacement of the clutch sleeve until speed synchronization is complete.

A primary design constraint associated with many conventional cone-type synchronizers however, is their inability to generate sufficient synchronizing torque capacity. This is due largely to dimensional limitations associated with the friction generating components utilized within the synchronizer mechanism. Typically, the "input" force applied by the vehicle operator during a gear shift is the only force exerted for generating the frictional "cone" torque required for speed synchronization.

SUMMARY OF THE INVENTION

It is therefore an object of this invention to overcome the disadvantages associated with the prior art by providing an improved dual-cone synchronizer mechanism having torque amplification means for generating an increase in the frictional cone torque developed.

The present invention, in its disclosed preferred embodiment, is a dual-cone synchronizer mechanism having first and second cone surfaces adapted for frictional engagement with first and second mating friction surfaces, respectively, upon selective energization of the synchronizer mechanism. The first cone surface is formed on an exterior surface of an inner cone ring which is rotatably supported on a transmission shaft. The second cone surface is formed on an interior surface of a blocker ring. The first and second cone surfaces define a clearance therebetween within which a middle cone ring is rotatably supported on the transmission shaft. The first friction surface is formed on the interior of the middle cone ring and the second friction surface is formed on the exterior of the middle cone ring. Torque amplification means are provided for operatively coupling the blocker ring and the inner cone ring to generate increased frictional engagement of the associated cone and friction surfaces upon energization of the synchronizer mechanism.

More specifically, the inner cone ring has a plurality of axially projecting drive tangs each of which is disposed in a an aperture formed on a radial flange portion of the blocker ring. Each drive tang is symmetrical about its longitudinal center line for defining a pair of back-angled cam edges. A cam edge of the drive tang is operative to slidably engage a complimentary angled side wall of its associated aperture upon an axial shifting force being applied to the synchronizer mechanism by the vehicle operator.

As the clutch sleeve is axially moved by the vehicle operator during a gear change, a thrust mechanism acts on the blocker ring to bring the blocker ring interior cone surface and the inner cone ring exterior cone surface into engagement with the exterior friction surface and the interior friction surface, respectively, of the middle cone ring for developing frictional "cone" torque therebetween. As the transmission shaft rotates, the frictional "cone" torque developed between the interior friction surface of the middle cone ring and the exterior cone surface of the inner cone ring causes the inner cone ring to rotate such that a back-angled cam edge of the drive tangs engages an angled side wall of its corresponding aperture for sliding movement relative thereto. Such sliding engagement results in an increase in the frictional clamping force between both the first and second cone surfaces and their respective first and second friction surfaces thereby increasing (i.e., amplifying) the synchronizer torque capacity. As such, the increased clamping force is a combination of the input force applied by the vehicle operator and an axially-directed force component generated by the "servo" action of the drive tangs slidably engaging the side walls of the aperture.

Further objects and advantages of the present invention will be apparent from the following description, reference being made to the accompanying drawings wherein a preferred embodiment of the present invention is clearly shown.

DETAILED DESCRIPTION OF THE INVENTION

Figure 1:
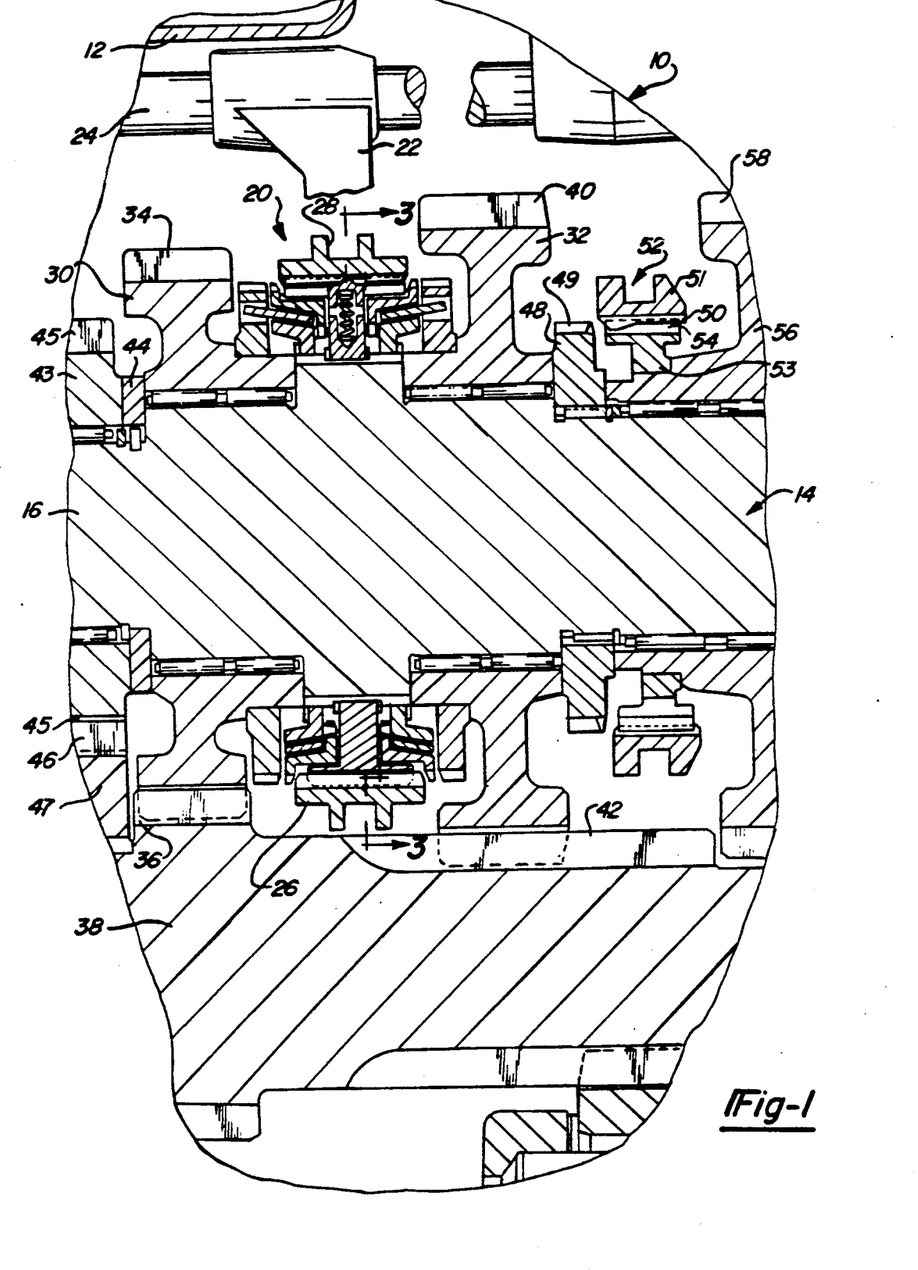
FIG. 1 is a vertical cross-sectional fragmentary view of a portion of an exemplary manual transmission equipped with the improved synchronizer mechanism of the present invention.
Figure 2:
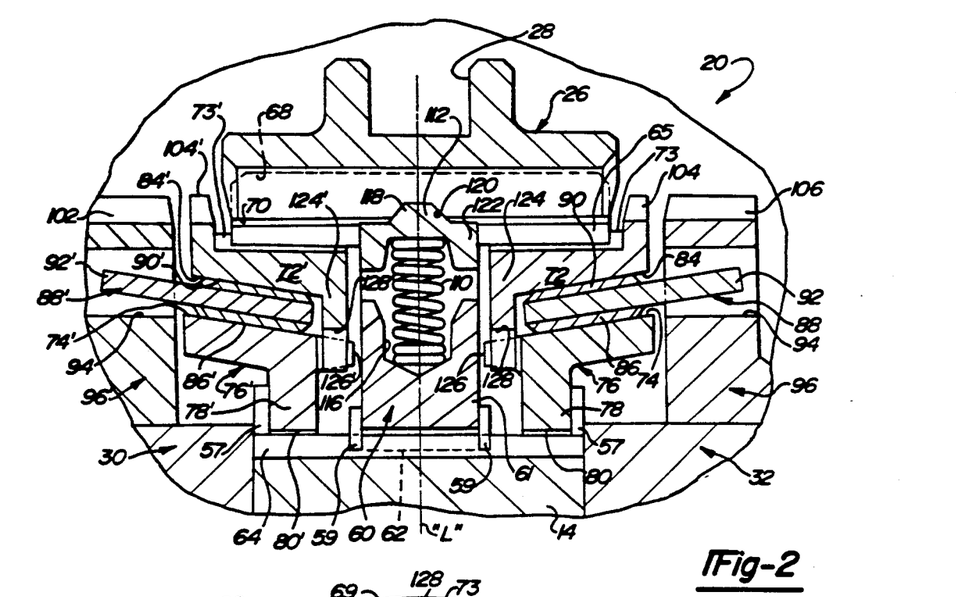
FIG. 2 is an enlarged fragmentary cross-sectional view of a portion of the synchronizer mechanism shown in FIG. 1.
Figure 3:
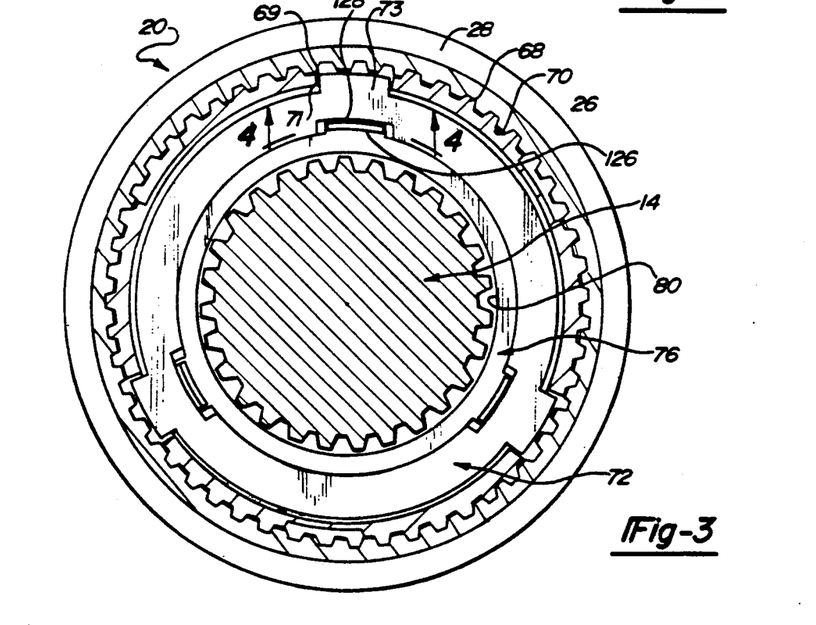
FIG. 3 is a cross-sectional view taken along line 3—3 of FIG. 1.

With particular reference to FIGS. 1 and 2, a portion of a five-speed motor vehicle manual transmission is shown generally at 10. Reference may be had to U.S. Pat. No. 4,677,868, issued Jul. 7, 1987 to T.J. Filkins, and assigned to the assignee of the present application for a more detailed description of an exemplary manual transmission suitable for use with the present invention. Manual transmission 10 includes a gear box housing, partially shown at 12, journally supporting an input shaft (not shown). The input shaft is connected by suitable clutch means to a motor vehicle engine crankshaft (not shown) journally supported in a circular housing opening as described in the above-mentioned Filkins patent.

A transmission shaft 14 has a forward pilot end 16 of reduced diameter which is coaxially journaled within an axial blind bore of the input shaft while a forward bearing assembly supports the forward end of transmission shaft 14 in housing 12. Again, such conventional structure is shown and thoroughly described in the above-mentioned Filkins patent. One or more synchromesh clutch units 20 are mounted on shaft 14. Clutch unit 20 is actuated by means of a shift fork, partially indicated at 22, which is supported on gear box shift selector rail 24. Thus, shift fork 22 is longitudinally slitable with its selector rail 24 and is connected by a yoke portion (not shown) to shift sleeve 26 of synchronizer unit 20 by means of a circumferential external groove 28.

In the disclosed embodiment, synchronizer unit 20 is commonly referred to as a "strut-type" unit. It is to be understood that while synchronizer 20 of the present invention is shown incorporated in a double-sided bi-directional synchronizer arrangement, it could likewise be incorporated into a single-sided uni-directional clutch without departing from the fair scope of the present invention. Thus, for example, the improved synchronizer could be used as a uni-directional synchronizer clutch in a transfer case. It is likewise to be understood that the principles of the present invention are also readily adaptable for use with most strutless-type synchronizer mechanisms.

Synchronizer unit 20 is depicted intermediate a transmission second speed gear 30 and a first speed gear 32 both of which are journally supported on shaft 14. Second speed gear 30 has its gear teeth 34 in constant meshing engagement with external spline teeth 36 formed on a transmission countershaft 38. Countershaft 38 is disposed parallel to shaft 14 and is suitably journally supported in housing 12. In a like manner, first speed gear 32 has its teeth 40 in constant meshing engagement with external spline teeth 42 formed on countershaft 38. It will be noted that a portion of a transmission third speed gear 43 is separated from second speed gear 30 by thrust washer 44 and third speed gear teeth 45 are in constant mesh with teeth 46 of drive gear 47 fixed, as by splines, on countershaft 38.

Further, a reverse clutch gear 48 is splined on transmission shaft 14 and has an external spline tooth surface 49 adapted to engage internal splines 50 on shift sleeve 51 of a transmission reverse clutch unit indicated generally at 52. Reverse clutch unit 52 has its hub 53 formed with external splined tooth surface 54, slidably receiving reverse sleeve internal spline 50. Hub 53 is fixed on main shaft reverse speed gear 56 which is shown journally supported on shaft 14 by needle bearings. Reverse speed gear 56 has its toothed surface 58 spaced from countershaft 38 in constant mesh with a conventional reverse idler gear (not shown).

As best seen in FIG. 2, bi-directional synchronizer unit 20 includes a hub 60 having an inner well 61 fixed to shaft 14 through hub internal splines 62 engaging main shaft external splines 64. A first pair of snap rings 57 are provided to retain associated inner cone rings, to be described, while a second pair of snap rings 59 axially position hub 6C on shaft 14. Hub 60 also has a longitudinally extending cylindrical portion 65 having externally splined surface 68 formed thereon. Shift sleeve 26 is mounted for rotation with hub 60 by means of its externally splined surface 68 being in sliding intermeshed engagement with internal sleeve splined surface 70. This, shift sleeve 26 is axially movable in a fore or aft direction on hub 60 by means of corresponding movement of shift fork 22. It will be noted in FIG. 5 that hub external splined surface 68 is formed with three equally spaced notches 69 extending toward web 61 for reasons to be explained below.

"Dual-cone" synchronizer clutch unit 20 is shown as having first and second cone surfaces and corresponding first and second mating friction surfaces for each of its associated first and second speed gears 32 and 30, respectively. Since bi-directional synchronizer mechanism 20 is symmetrical about a central transverse plane of construction line "L" in FIG. 2, like numbers will be used to describe right and left hand parts, with the left hand parts being primed. Thus, operation of only the right hand first speed clutch components of synchronizer clutch mechanism 20 will be described in greater detail. Furthermore, while the preferred embodiment illustrates the use of substantially mirror-imaged components for the left and right hand portions of synchronizer 20, it will be appreciated that such use is not a limitation to the present invention.

Synchronizer unit 20 includes a pair of fore and aft (i.e., left and right) blocker rings 72' and 72, respectively. Blocker rings 72' and 72 have three raised lugs 73' and 73, respectively, which are equally spaced at 120° intervals therearound. Each lug is adapted to nest within its associated hub notch 69. As is known in the synchronizer art, during the synchronization process blocker ring 72 indexes or "clocks" such that lugs 73 have one of their respective side faces 71 in contact with an edge of notch 69 to inhibit further axial travel of shift sleeve 26 until speed synchronization is completed.

Figure 5:
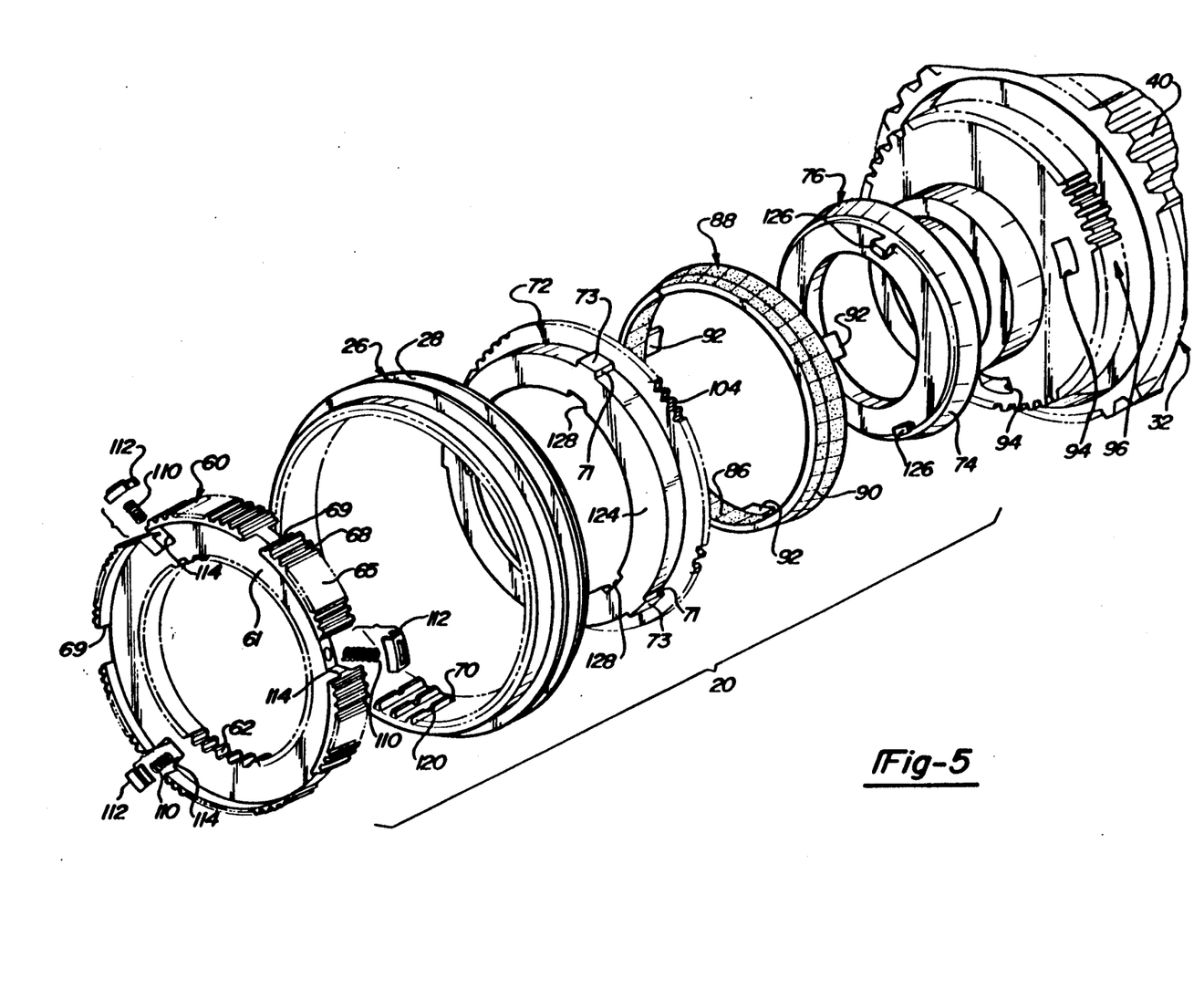
FIG. 5 is an exploded perspective view of the synchronizer mechanism shown in FIG. 1.

With particular reference to FIG. 2 and 5, a first cone surface 74 is illustrated as being formed on an exterior surface of inner cone ring 76. Inner cone ring 76 has a radially extending flange portion 78 with a central aperture 80 defining a clearance with transmission shaft 14. A second cone surface 84 is formed on an interior surface of blocker ring 72. A first conical friction surface 86 is located on the interior surface of middle cone ring 88, while a second conical friction surface 90 is located on the exterior of middle cone ring 88. First friction surface 86 is adapted to contact first cone surface 74 while second external friction surface 90 is adapted to contact second cone surface 84 upon energization of synchronizer mechanism 20. It will be noted that in the disclosed embodiment, friction surfaces 86 and 90 are in the form of a friction pad or lining bonded or cemented to interior and exterior conical surfaces, respectively, of middle cone ring 88 for providing effective frictional engagement. An e>ample of one type of suitable friction lining that may be used with the present invention is disclosed in U.S. Pat. No. 4,267,912 issued May 29, 1981 to Bauer, et al, the disclosure of which is expressly incorporated by reference herein.

As best seen in FIGS. 2 and 5, middle cone ring 88 has three (3) generally axially directed locking fingers 92 formed integral therewith which are uniformly spaced on 120° centers. Locking fingers 92 project rightwardly and are disposed in an associated axially positioned window 94 formed in a radial flange portion 96 of first speed gear 32. Similarly, locking fingers 92' project leftwardly and are disposed in an associated axially positioned window 94' formed in flange portion 96' of second speed gear 30. Flange portion 96' of second speed gear 30 has a splined surface 102 which is coaxial and alignable with a splined surface 104' formed on a raised outer circumference portion of synchronizer blocker ring 72'. Both splined surfaces 102 and 104' are engagable with shift sleeve internal splined surface 70, upon shift sleeves 26 being shifted leftwardly into its second speed gear mode. In a like manner, flanged portion 96 of first speed gear 32 has a splined surface 106 coaxial and alignable with splined surface 104 of blocker ring 72. Both splined surfaces 106 and 104 are engageable by shift sleeve internal splined surface 70 upon shift sleeve 26 being shifted rightwardly into its first speed gear mode.

Shift sleeve 26 of synchronizer mechanism 20 is shown in FIGS. 1 and 2 in a central disengaged or "neutral" position. Since internally splined surface 70 of shift sleeve 26 is in constant axial sliding engagement with externally splined surface 68 formed on hub 60, shift sleeve 26 may be manually shifted to the right or left to complete lock-up of first or second speed gears, respectively, such that internally splined surface 70 drivingly engages external spline teeth 106 and 102, respectively.

In blocking synchronizer 20, a "strut-type" thrust mechanism, is shown to include helical compression spring 110 which is compressed and inserted between a key-like "strut" 112 and hub 60. In the particular embodiment shown, three (3) struts 112 are uniformly spaced on 120° centers and are biased radially outwardly in their respective longitudinally extending guide slots 114 formed in hub web 61. A portion of compression spring 110 is disposed within a spring seat bore 116 extending radially into hub web 61. Struts 112 each have a raised central stop projection or "hump" portion 118 which is adapted to engage a corresponding central "detent" groove 20 circumferentially formed in shift sleeve internal splined surface 70 when shift sleeve 26 is in its "neutral" position.

Compression springs 110 are sized to produce a sufficient compressive force for normally biasing struts 112 in a radially outward direction to permit struts 112 to move in an axial direction upon axial movement of shift sleeve 26. For example, initial rightward axial movement of shift sleeve 26 toward first speed gear 32 causes struts 112 to correspondingly move axially in the same direction until a transverse end face 122 of struts 112 engages a facing surface of radial inwardly extending flange 124 on blocker ring 72. In particular, springs 110 bias hump 118 of struts 112 into maintained engagement with detent groove 120 such that both shift sleeve 26 and struture 112 move out of the central position (construction line "L") of FIG. 2. It will be appreciated that the type of strut and spring illustrated and described herein are merely exemplary of components commonly associated with a strut-type synchronizer mechanism.

In accordance to the teachings of the present invention, torque amplification means are provided for amplifying the frictional "clamping" engagement generated within synchronizer mechanism 20 upon the vehicle operator selectively shifting clutch sleeve 26 to produce an increased torque capacity in dualcone synchronizer 20. More particularly, inner cone ring 76 is shown to include a plurality of three (3) axially projecting torque drive tangs 126 formed integral therewith and which are uniformly spaced on 120° centers. Torque drive tangs 126 extend generally parallel to a principal longitudinal axis of shaft 14 and are adapted to nest in an aperture or window 128 formed in a radial flange portion 124 of blocker ring 72.

Figure 4A:
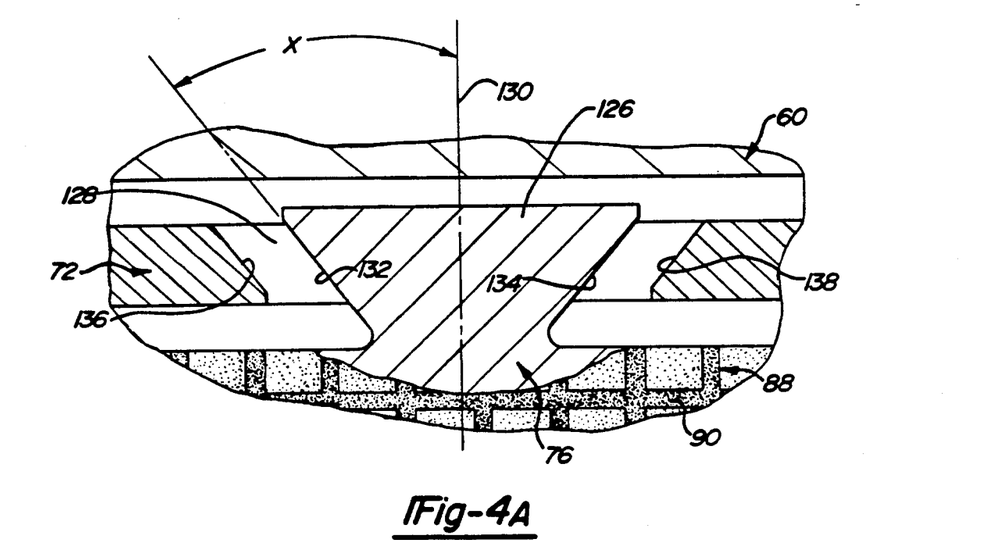
FIG. 4A is a fragmentary cross-sectional view, with parts broken away, taken substantially along line 4—4 of FIG. 3.
Figure 4B:
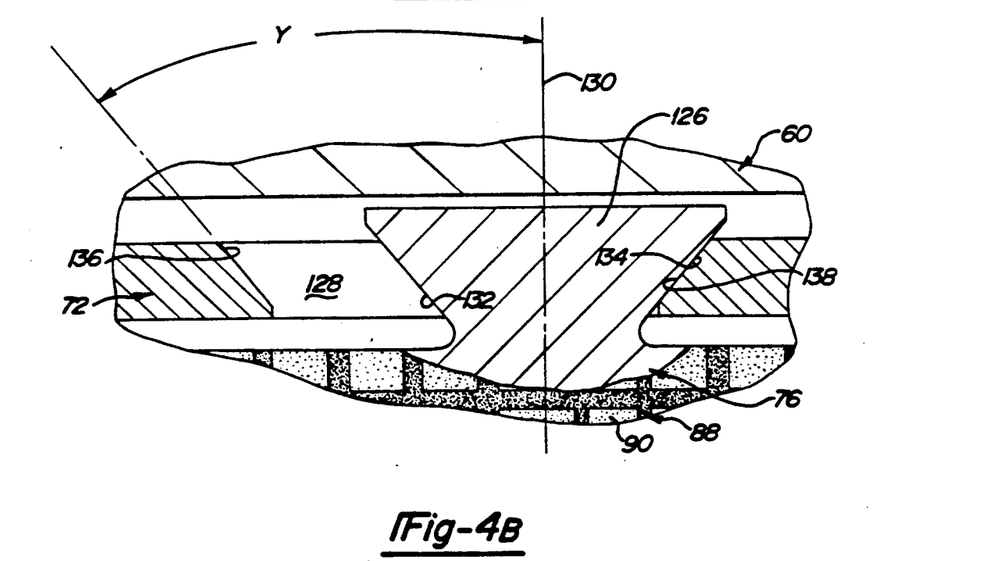
FIG. 4B is a view similar to FIG. 4A, showing the inner cone ring rotated wherein its back-angled cam edges are in engagement with complimentary angled side wall surfaces formed in said blocking ring.

With particular reference to FIGS. 4A, 4B and 5, drive tangs 126 are preferably formed symmetrically about their longitudinal axis which coincides with an axial center line 130 of their associated windows 128 when synchronizer mechanism 20 is in the "neutral" position (FIG. 4A). Drive tangs 126 define a pair of back-angled cam edges 132 and 134. Each back-angled cam edge 132 and 134 is shown diverging outwardly from center line 130 at a predetermined acute angle "X" which, in the disclosed embodiment, defines an acute angle in the range of about 10° to 40°. More preferably, acute angle "X" is in the range of about 18° to 22°. It will be noted that window 128 is also formed symmetrically about center line 130 with its opposed side walls 136 and 138 each disposed at a predetermined acute angle "Y" (FIG. 4B) relative to center line 130 Preferably, acute angles "X" and "Y" match or are substantially equal to provide for sliding engagement therebetween. Thus, window side wall 136 is disposed in parallel spaced relation to its associated drive tang cam edge 132 and window side wall 138 is disposed in parallel spaced relation to its associated drive tang cam edge 134 with synchronizer 20 in the "neutral" position of FIG. 4A.

As is known in the synchronizer art, initial engagement of struts 112 with radial flange 124 of blocker ring 72 causes blocker ring 72 to move axially for taking up the running clearances for generating frictional "cone" torque loading between blocker ring interior cone surface 84 and middle cone ring exterior friction surface 90. As such, blocking ring 72 is "clocked" to an indexed position for preventing continued axial displacement of shift sleeve 26 until synchronization is complete. Upon continued frictional engagement, interior friction surface 86 of middle cone ring 88 frictionally engages exterior cone surface 74 of inner cone ring 76 for generating "cone" torque loading therebetween. This frictional engagement causes inner cone ring 76 to be rotated or "clocked" to an indexed position wherein drive tang back-angled edges 134 slidably engage their associated window side walls 138. As best seen in FIG. 4B, the axially directed input force exerted by the vehicle operator causes sliding interaction between back-angled edges 134 and side walls 138 which acts to draw inner cone ring 76 axially inwardly toward radial flange 124 of blocker ring 72 (i.e., toward hub 60). Simultaneously, blocker ring 76 is drawn axially toward first speed gear 32. Therefore, cone surfaces 74 and 84 are being concurrently drawn into tighter frictional engagement with their respective friction surfaces 86 and 90. This tighter "clamping" engagement results in an increased frictional "cone" torque (i.e., synchronizing torque) for a given axial input force applied by the vehicle operator.

With blocker ring 72 in its indexed position, sleeve 26 moves to a chamfer-to-chamfer loading position between the opposed spline faces of exterior splined surface 104 on blocker ring 72 and shift sleeve interior splined surface 70. When the speed of first speed gear 32 relative to blocker ring 72 and shift sleeve 26 approaches zero, the total "cone" torque falls to zero. Synchronization is now complete and blocker ring 72 is no longer energized. Since the "index" torque resulting from the chamfer-to-chamfer loading exceeds the total "cone" torque, blocker ring 72 is free to rotate in a opposite direction and out of its "clocked" position. Thereafter, first speed gear 32 can be rotated aside to pass sleeve internal splined surface 70 beyond blocker ring teeth 104 until initial locked contact is made between sleeve splined surface 70 and first gear exterior splined surface 106. As will be appreciated, similar interaction of the components associated with the left half of clutch unit 20 occurs during leftward axial movement of shift sleeve 26 for shifting into engagement with second speed gear 30.

As mentioned, while the preferred embodiment discloses angles "X" and "Y" to be in the range of about 18° to 22°, other angles may be used depending on various factors such as the type of friction materials used for the friction pad or lining on friction surfaces 86 and 90. Thus the angular configuration of drive tang cam edges 132 and 134 may be within any suitable range without departing from the fair scope of the present invention. Likewise, it is to be understood that window side walls 136 and 138 are preferably formed at a substantially matching acute angle equal to the selected angle "X".

While a specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed is:

1. A speed synchronizer apparatus for use in a transmission having a transmission shaft, said synchronizer apparatus including an externally splined hub fixed for rotation on said transmission shaft, a first gear journally mounted on said transmission shaft adjacent one axial side of said hub and having an externally splined surface, a shift sleeve having an internally splined surface slidably coupled to said hub externally splined surface and being axially movable thereon in a first direction from a neutral position to a first operative position wherein said shift sleeve internally splined surface engages said first gear externally splined surface for coupling said first gear for rotation with said transmission shaft, a blocker ring concentrically disposed about said transmission shaft and having first conical surface means adapted to define a clearance with second conical surface means formed on an inner cone ring supported for reciprocal movement relative thereto, a middle cone ring concentrically disposed in said clearance and having first friction surface means adapted to frictionally engage said first conical surface means and second friction surface means adapted to frictionally engage said second conical surface means for developing synchronizing torque therebetween upon energization of said synchronizer apparatus, and thrust means engageable with said shift sleeve and said blocker ring during axial shifting operation of said shift sleeve in said first direction for energizing said synchronizer apparatus, the improvement comprising;

torque amplification means operatively interconnecting said blocker ring and said inner cone ring for causing at least one of said inner cone ring and said blocker ring to move axially relative to the other for generating increased frictional engagement between said first and second conical surface means and said first and second friction surface means respectively, said torque amplification means including a plurality of drive tangs longitudinally extending from said inner cone ring and adapted to project into associated apertures formed in said blocker ring, each said drive tangs having a circumferential width substantially less than the circumference of said inner ring such that said drive tang is substantially narrow with respect to the circumferential distance between the drive tangs and a cam surface on each of its longitudinal sides for defining a first acute and each said cam surfaces and which are formed at a second acute angle such that said first angel is substantially equal to said second angle, said drive tang cam surfaces being a pair of symmetrical back-angled cam edges which diverge outwardly from a centerline of said drive tangs at said first acute angle, and wherein said side walls define a pair of symmetrically disposed blocker ring side walls which diverge outwardly at said second acute angle, and wherein said second acute angle being substantially equal to said first acute angle, whereby said synchronizing torque developed by said synchronizer apparatus is increased with respect to a given input force exerted by a vehicle operator.

2. The transmission synchronizer apparatus of claim 1 wherein upon said shift sleeve being initially moved in said first direction said thrust means acts on said blocker ring such that said first conical surface means of said blocker ring frictionally engages said first friction surface means of said middle cone ring for concurrently causing frictional engagement between said second conical surface means of said inner cone ring and said second frictional surface means of said middle cone ring, whereby said inner cone ring is rotated relative to said blocker ring for causing said inner cone ring cam surface means to slidingly engage said side walls of said blocker ring.

3. The transmission synchronizer apparatus of claim 1 wherein said inner cone ring has three drive tangs uniformly spaced on 120° centers which extend toward said hub, and wherein said aperture means is formed on an inwardly extending radial flange portion of said blocker ring.

4. The transmission synchronizer apparatus of claim 1 wherein said drive tangs are formed as an integral extension of said second conical surface means.

5. The transmission synchronizer apparatus of claim 1 further comprising a second gear journally mounted on said transmission shaft adjacent the other axial side of said hub and having an externally splined surface, said shift sleeve being axially movable in an opposite direction from said neutral position to a second operative position wherein said internally splined surface of said shift sleeve engage said second gear externally splined surface for coupling said second gear for rotation with said transmission shaft, a second blocker ring having third conical surface means adapted to define a second clearance with fourth conical surface means formed on a second inner cone ring, a second middle cone ring concentrically disposed in said second clearance and defining third friction surface means adapted to frictionally engage said third conical surface means and fourth friction surface means adapted to frictionally engage said fourth conical surface means, and wherein said torque amplification means define first and second axially extending drive tangs respectively disposed in first and second aperture means formed in said first and second blocker rings, respectively, each of said drive tangs defining a backangled cam edge which diverges outwardly at a first acute angle, each of said aperture means forming an angled side wall engageable with said back-angled cam edge and which is configured to diverge outwardly at a second acute angle.

6. The transmission synchronizer apparatus of claim 5 wherein movement of said shift sleeve in said first direction causes said thrust means to act on said first blocker ring such that said first conical surface means of said first blocker ring frictionally engages said first friction surface means of said first middle cone ring for causing frictional engagement between said second conical surface means of said first inner cone ring and said second frictional surface means of said first middle cone ring, whereby said first inner cone ring rotates relative to said first blocker ring for causing said back-angled cam edge of said first drive tangs to slidably engage said angled side wall of said first aperture means, and wherein when said shift sleeve is moved initially in said second direction said thrust means acts on said second blocker ring such that said third conical surface means of said second blocker ring frictionally engages said third friction surface means of said second cone ring for causing frictional engagement between said fourth conical surface means of said second inner cone ring and said fourth friction surface means of said second middle cone ring whereby said second inner cone ring is rotated relative to said second blocker ring for causing said back-angled cam edge of said second drive tangs to slidingly engage said angled side wall of said second aperture means.

7. The transmission synchronizer apparatus of claim 6 wherein said first and second acute angles are in the range of about 10° to 40° relative to a centerline of said drive tang and said aperture means, respectively; and when said first and second acute angles are substantially equal.

8. A manual transmission double-acting synchronizer apparatus operatively associated with a transmission shaft with said synchronizer apparatus located intermediate first and second gears journally mounted on said shaft, each of said gears having an externally splined surface concentrically formed thereon, said synchronizer apparatus comprising:

a hub fixed on said transmission shaft intermediate said gears and having an externally splined surface formed thereon;

a shift sleeve having an internally splined surface intermeshed with said hub externally splined surface and adapted for slidable axial travel relative to said hub in a first and second direction for selectively engaging said first and second gear splined surfaces, respectively, so as to alternately couple said first and second gears for rotation with said transmission shaft;

a first blocker ring concentrically surrounding said transmission shift intermediate said first gear and said hub and having a first conical surface;

a first inner cone ring concentrically surrounding said transmission shaft and having a second conical surface adapted to define a first clearance with said first conical surface;

a first middle cone ring concentrically disposed in said first clearance having a first friction surface adapted to frictionally engage said first conical surface and a second friction surface adapted to frictionally engage said second conical surface for developing frictional cone torque therebetween upon energization of said apparatus upon movement of said shift sleeve in said first direction;

a second blocker ring concentrically surrounding said transmission shaft intermediate said second gear and said hub and having a third conical surface;

a second inner cone ring concentrically surrounding said transmission shaft and having a fourth conical surface adapted to define a second clearance with said third conical surface;

a second middle cone ring concentrically disposed in said second clearance having a third friction surface adapted to frictionally engage said third conical surface and a fourth friction surface adapted to frictionally engage said fourth conical surface for developing frictional cone torque therebetween upon energization of said apparatus upon movement of said shift sleeve in said second direction;

thrust means for moving one of said first and second blocker rings toward its associated gear during axial shifting operation of said shift sleeve for energizing said apparatus; and torque amplification means operatively interconnecting said first and second blocker rings to said first and second inner cone rings respectively, for causing at least one of said first blocker ring and said first inner cone ring to move axially relatively to the other for generating increased frictional engagement between said first and second conical surfaces and said first and second friction surfaces, respectively, when said shift sleeve is moved in said first direction, and wherein said torque amplification means causes at least one of said second blocker ring and said second inner cone ring to move axially relative to the other for generating increased frictional engagement between said third and fourth conical surfaces and said third and fourth friction surfaces, respectively, when said shift sleeve is moved in said second direction, said torque amplification means including a plurality of drive tangs longitudinally extending from said first and second inner cone rings and adapted to project into associated apertures formed in said first and second blocker rings, respectively, each said drive tangs having a circumferential width substantially less than the circumference of said inner ring such that said drive tang width is substantially narrow with respect to the circumferential distance between adjacent drive tangs and a cam surface on each of its longitudinal sides for defining a first acute angle and each said aperture forming complementary angled side wall means for defining a second acute angle such that said first angle is substantially equal to said second angle, said drive tang cam surfaces being a pair of symmetrical back-angled cam edges which diverge outwardly from a centerline of said drive tangs at said first acute angle, and wherein said side walls define a pair of symmetrically disposed blocker ring side walls which diverge outwardly at said second acute angle, and wherein said second acute angle being substantially equal to said first acute angle, whereby said frictional cone torque generated by said synchronizer apparatus is increased for a given input force exerted by a vehicle operator during said axial shifting operation.

9. The synchronizer apparatus of claim 8 wherein said cam surface means is located in generally spaced relation to said angled side walls means when said shift sleeve is in a neutral position, whereby upon said shift sleeve being initially moved in either of said first and second directions the resulting frictional mating engagement of said conical surfaces and said friction surfaces causes said inner cone ring to rotate relative to said blocker ring for causing said cam surface means to slidingly engage to angled side wall means.

10. The synchronizer apparatus of claim 9 wherein said first and second inner cone rings each have three drive tangs uniformly spaced on a 120° centers which extend axially toward said hub, and wherein said aperture means is formed on an inwardly extending radial flange portion of said first and second blocker rings.

11. The synchronizer apparatus of claim 8 wherein said first and second acute angles define an angle in the range of about 10° to 40°.

12. In a synchronizer and gear assembly comprising:
a longitudinally extending transmission shaft with at least one ratio gear journally mounted on said shaft, an externally splined hub fixed on said shaft and a shift sleeve having internal splines coupled to said hub external splines for slidable movement thereon to an operative position for engaging said ratio gear so as to couple said ratio gear in rotation with said shaft, a blocker ring having an internal cone surface defining a clearance with an external cone surface formed on an inner cone ring, a thrust mechanism disposed between said shift sleeve and said blocker ring for energizing said assembly upon sliding movement of said shift sleeve toward said ratio gear, a middle cone ring is concentrically disposed in said clearance adjacent said blocker ring internal cone surface, said middle cone ring defining an external cone surface adapted to frictionally engage said blocker ring internal cone surface said middle cone ring defining an internal cone surface adapted to frictionally engage said inner cone ring external cone surface, an improvement wherein said inner cone ring has a plurality of axially extending drive tangs which project into complementary aperture means formed in said blocker ring, a circumferential width substantially less than the circumference of said inner ring such that said drive tang width is substantially narrow with respect to the circumferential distance between adjacent drive tangs and said drive tangs disposed about its longitudinal center line for defining a back-angled cam edge which diverges outwardly from said centerline at a predetermined acute angle, said aperture means having an angled side wall which diverges outwardly at a second acute angle, whereby upon said shift sleeve being initially moved said thrust mechanism presses said blocking ring internal cone surface against said middle cone ring external friction surface for causing said middle cone ring internal friction surface to press against said inner cone ring external cone surface such that said inner cone ring is rotated relative to said blocker ring such that said drive tang back-angled cam edge slidably engages said opposed angled side wall formed in said blocker ring, said sliding engagement acting to draw said blocker ring toward said ratio gear such that said blocker ring internal cone surface and said inner cone ring external cone surface are drawn into tighter frictional engagement with said middle cone ring external friction surface and said middle cone ring internal friction surface, respectively, whereby the frictional cone torque developed by said assembly is increased for a given synchronizer axial input force.

13. The synchronizer and gear assembly of claim 12 wherein said inner cone ring has a plurality of at least three drive tangs uniformly spaced at a 120° centers, and wherein said aperture means is formed on an inwardly extending radial flange portion of said blocker rings.

14. The synchronizer and gear assembly of claim 13 wherein said drive tangs have their back-angled cam edges formed at said predetermined acute anqle in the range of about 10° to 40°.

15. The synchronizer and gear assembly of claim 14 wherein said drive tangs have their back-angled cam edges formed at said predetermined acute angle in the range of about 18° to 22°, and wherein said second acute angle is substantially equal to said predetermined acute angle.

16. The synchronizer and gear assembly of claim 16 wherein said drive tangs are formed as an integral extension of said external cone surface of said inner cone ring.

* * * * *

UNITED STATES PATENT AND TRADEMARK OFFICE
CERTIFICATE OF CORRECTION

PATENT NO. : 5,135,087

DATED : August 4, 1992

INVENTOR(S) : Barry L. Frost

It is certified that error appears in the above-identified patent and that said Letters Patent is hereby corrected as shown below:

Column 3, line 29, "slitable" should be --slidable--.

Column 4, line 6, "well" should be --web--.

Column 4, line 11, "6C" should be --60--.

Column 4, line 17, "This" should be --Thus--.

Column 4, line 68, "e>ample" should be --example--.

Column 5, line 51, "20" should be --120--.

Column 5, line 66, "structure" should be --strut--.

Column 8, line 25, Claim 1, after "acute" insert --angle--.

Column 8, line 25, Claim 1, after "each" insert --said aperture defining side walls engageable with--.

Column 10, line 4, Claim 8, "shift" should be --shaft--.

Column 11, line 15, Claim 9, "walls" should be --wall--.

UNITED STATES PATENT AND TRADEMARK OFFICE
CERTIFICATE OF CORRECTION

PATENT NO. : 5,135,087

DATED : August 4, 1992

INVENTOR(S) : Barry L. Frost

It is certified that error appears in the above-identified patent and that said Letters Patent is hereby corrected as shown below:

Column 12, line 43, Claim 14, "angle" should be --angle--.

Signed and Sealed this

Twelfth Day of October, 1993

*Attest:*

BRUCE LEHMAN

*Attesting Officer*   *Commissioner of Patents and Trademarks*